(12) United States Patent
Yang et al.

(10) Patent No.: US 8,749,999 B2
(45) Date of Patent: Jun. 10, 2014

(54) CONTROLLER AND POWER CONVERTER USING THE SAME FOR CLAMPING MAXIMUM SWITCHING CURRENT OF POWER CONVERTER

(75) Inventors: Ta-Yung Yang, Milpitas, CA (US);
Keun-Eul Hong, DongJakGu (KR);
Jung-Sheng Chen, Kaohsiung (TW);
Ju-hyun Kim, Siheung (KR)

(73) Assignee: System General Corporation, New Taipei (TW)

( * ) Notice: Subject to any disclaimer, the term of this patent is extended or adjusted under 35 U.S.C. 154(b) by 241 days.

(21) Appl. No.: 13/344,134

(22) Filed: Jan. 5, 2012

(65) Prior Publication Data
US 2013/0063112 A1 Mar. 14, 2013

Related U.S. Application Data

(60) Provisional application No. 61/534,550, filed on Sep. 14, 2011.

(51) Int. Cl.
*H02M 3/335* (2006.01)
*H02H 7/122* (2006.01)

(52) U.S. Cl.
USPC ............. 363/56.11; 363/21.13; 363/21.15; 363/56.1; 363/97

(58) Field of Classification Search
USPC ............ 363/21.08, 21.09, 21.16, 21.17, 56.1, 363/56.11, 97, 21.05, 21.07, 21.13, 21.15
See application file for complete search history.

(56) References Cited

U.S. PATENT DOCUMENTS 7,633,777 B2 * 12/2009 Lin ............................. 363/56.11
2011/0157923 A1 * 6/2011 Ren et al. .................... 363/21.12

* cited by examiner

*Primary Examiner* — Gary L Laxton
(74) *Attorney, Agent, or Firm* — McClure, Qualey & Rodack, LLP

(57) ABSTRACT

A controller of a power converter is provided. The controller includes a feedback circuit, an output circuit, and a clamping circuit. The feedback circuit generates a feedback signal in accordance with output of the power converter. The output circuit generates a switching signal in accordance with the feedback signal for regulating the output of the power converter. The clamping circuit limits the feedback signal under a first level for a first load condition and limits the feedback signal under a second level for a second load condition. The clamping circuit includes a timer circuit. The timer circuit determines a slew rate of the feedback signal for increasing the feedback signal from the first level to the second level, and the second level is higher than the first level.

14 Claims, 5 Drawing Sheets

CONTROLLER AND POWER CONVERTER USING THE SAME FOR CLAMPING MAXIMUM SWITCHING CURRENT OF POWER CONVERTER

CROSS REFERENCE TO RELATED APPLICATIONS

This application claims the benefit of U.S. Provisional Application No. 61/534,550, filed on Sep. 14, 2011, the contents of which are incorporated herein by reference.

BACKGROUND OF THE INVENTION

1. Field of the Invention

The invention relates to a power converter, and more particularly to a controller for limiting the switching current of a power converter.

2. Description of the Related Art

A power converter normally performs voltage and/or current regulation. In order to control a current, it requires developing a current loop for the current controlling. However, the current loop is slow in general. Thus, a higher switching current would be produced during load change, particularly, when an output load is changed from a light load to a heavy load or the output is in a short-circuit.

Thus, it is desired to provide a controller to clamp a maximum switching current for solving the above problems.

BRIEF SUMMARY OF THE INVENTION

An exemplary embodiment of a controller of a power converter is provided. The controller comprises a feedback circuit, an output circuit, and a clamping circuit. The feedback circuit generates a feedback signal in accordance with output of the power converter. The output circuit generates a switching signal in accordance with the feedback signal for regulating the output of the power converter. The clamping circuit limits the feedback signal under a first level for a first load condition and limits the feedback signal under a second level for a second load condition. The clamping circuit includes a timer circuit. The timer circuit determines a slew rate of the feedback signal for increasing the feedback signal from the first level to the second level, and the second level is higher than the first level.

An exemplary embodiment of a controller a controller for limiting a switching current of a power converter is provided. The controller comprises a feedback circuit, an output circuit, a clamping circuit, and a current limit threshold. The feedback circuit generates a feedback signal in accordance with output of the power converter. The output circuit generates a switching signal in accordance with the feedback signal for regulating the output of the power converter. The clamping circuit limits the feedback signal under a first level for a first load condition and limits the feedback signal under a second level for a second load condition. The current limit threshold is coupled to limit the switching current of the power converter. The clamping circuit has a timer circuit determining a slew rate of the feedback signal for increasing the feedback signal from the first level to a second level, and the second level is higher than the first level.

Another exemplary embodiment of a controller for limiting a switching current of a power converter is provided. The controller comprises a feedback circuit, an output circuit, and a current limit threshold. The feedback circuit generates a feedback signal in accordance with output of the power converter. The output circuit generates a switching signal in accordance with the feedback signal for regulating the output of the power converter. The current limit threshold is coupled to limit the switching current of the power converter. The switching signal is coupled to switch a transformer for regulating the output of the power converter, and the current limit threshold is changed in response to the change of an input voltage of the power converter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
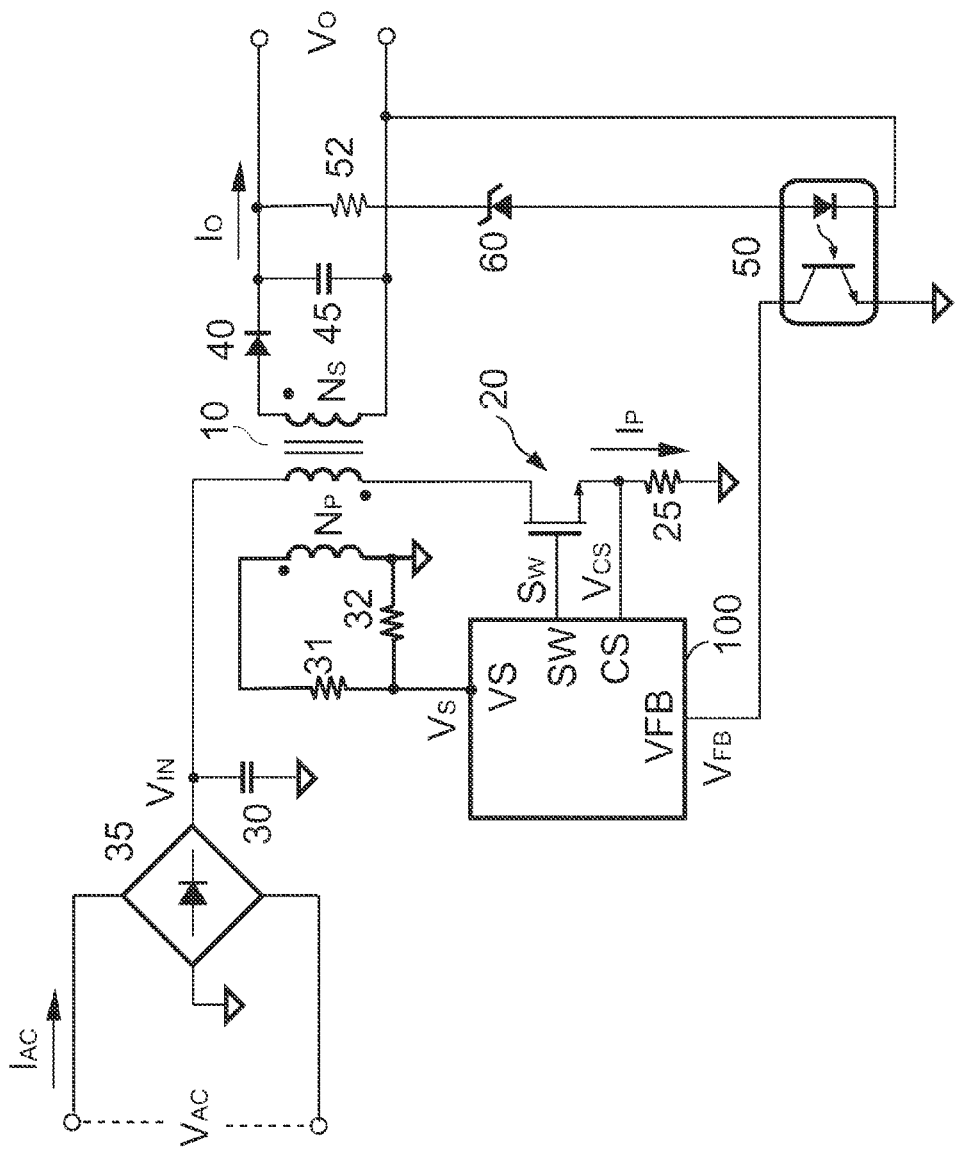
FIG. 1 shows an exemplary embodiment of a power converter.

FIG. 1 shows an embodiment of a power converter. As shown in FIG. 1, the power converter comprises a transformer 10, a power transistor 20, a resistor 25, a capacitor 30, resistors 31 and 32, a bridge rectifier 35, a rectifier 40, a capacitor 45, an opto-coupler 50, a resistor 52, a zener diode 60, and a controller 100. The bridge rectifier 35 rectifies an input AC voltage $V_{AC}$ to a DC input voltage $V_{IN}$ at the capacitor 30. A primary winding $N_P$ of the transformer 10 receives the DC input voltage $V_{IN}$. Thus, the DC input voltage $V_{IN}$ can be detected through the transformer 10. The controller 100 generates a switching signal $S_W$ coupled to switch the transformer 10 via the power transistor 20. The switching signal $S_W$ is generated in accordance with a feedback signal for regulating output of the power converter. The rectifier 40 and the capacitor 45 are coupled to a secondary winding $N_S$ of the transformer 10 for generating an output voltage $V_O$ of the power converter. In other words, the resistor 52, the zener diode 60, and the opto-coupler 50 generate a voltage feedback signal $V_{FB}$ coupled to the controller 100. The voltage feedback signal $V_{FB}$ is correlated to the level of the output voltage $V_O$.

The resistor 31 and the resistor 32 are coupled from an auxiliary winding of the transformer 10 to the controller 100 to generate a signal $V_S$. The controller 100 detects the output voltage $V_O$ via the signal $V_S$ during switching of the transformer 10. The signal $V_S$ is also related to demagnetizing time of the transformer 10. The demagnetizing time of the transformer 10 associated with a current-sense signal $V_{CS}$ can be used for controlling an output current $I_O$. A switching current $I_P$ of the transformer 10 flows through the resistor 25 that generates the current-sense signal $V_{CS}$ coupled to the controller 100 for the limit of the switching current $I_P$.

Figure 2:
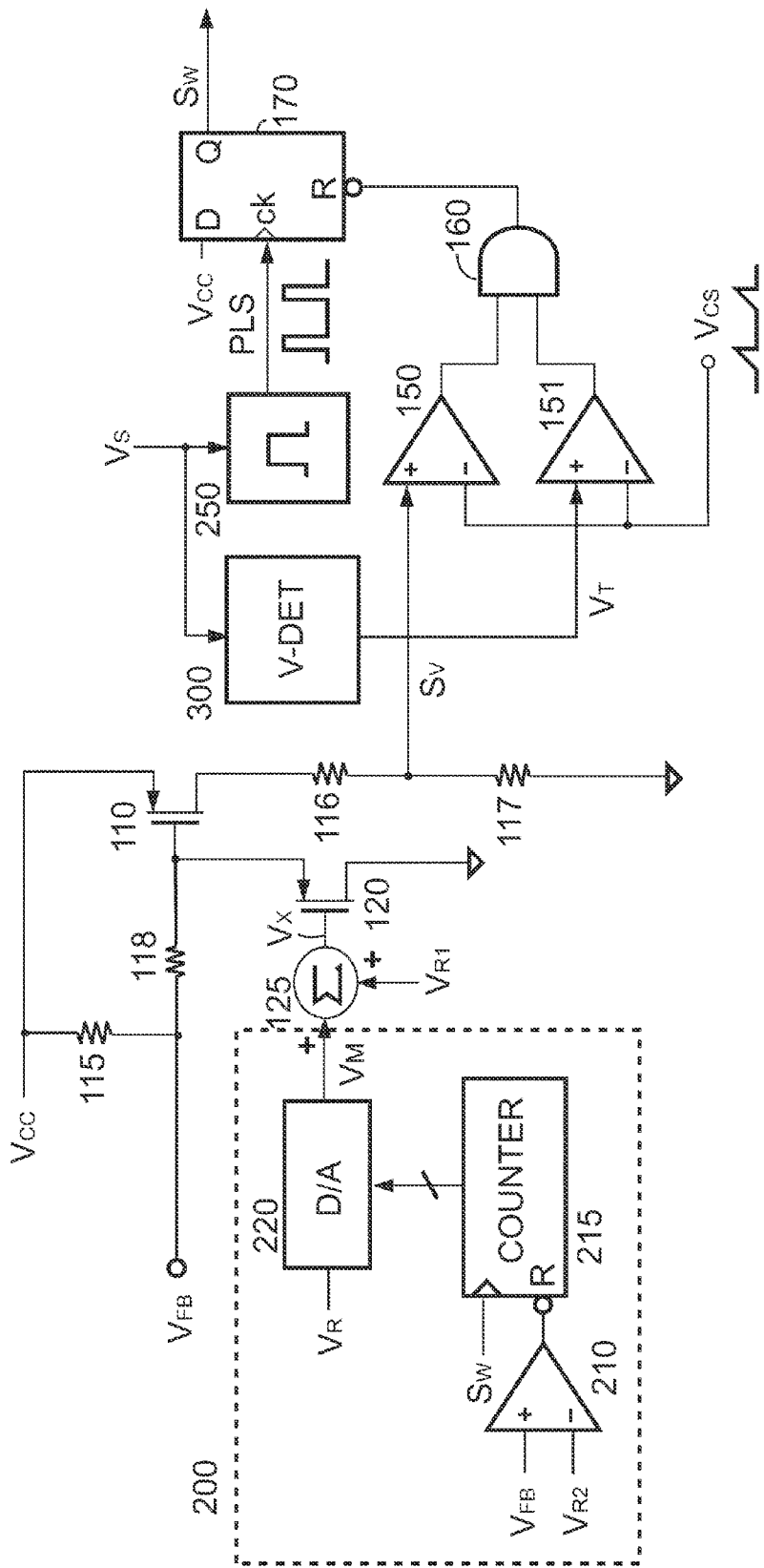
FIG. 2 shows one exemplary embodiment of a controller in the power converter of FIG. 1.

FIG. 2 shows one embodiment of the controller 100. The controller 100 comprises a transistor 120, an addition circuit 125, a voltage detection circuit (V-DET) 300, a level shifting circuit, a clamping circuit, and an output circuit. The voltage detection circuit 300 is coupled to detect the signal $V_S$ for generating a threshold $V_T$ (current limit threshold). Comparators 150 and 151, an AND gate 160, a flip-flop 170, and a pulse generation circuit 250 develop the output circuit. The threshold $V_T$ is coupled to the comparator 151 to compare with the current-sense signal $V_{CS}$. According to the previous description, the threshold $V_T$ is generated according to the signal $V_S$, and the signal Vs is transformed from the primary winding $N_P$ of the transformer 10. So the threshold $V_T$ (current limited threshold) is changed in response to the change of the input voltage $V_{IN}$ of the power converter. Also, the level of the threshold $V_T$ is determined by the level of the output voltage $V_O$. The level shifting circuit is coupled to receive the voltage feedback signal $V_{FB}$ to generate a voltage-loop feedback signal $S_V$. A transistor 110 and resistors 115, 116, 117, 118 develop the level-shift circuit. Since the voltage feedback signal $V_{FB}$ is correlated to the level of the output voltage $V_O$, the level-shift circuit is also referred as a feedback circuit which generates the voltage-loop feedback signal $S_V$ according to the output of the power converter (such as the output voltage $V_O$). The voltage-loop feedback signal $S_V$ is coupled to the comparator 150 to compare with the current-sense signal $V_{CS}$ and generate a signal to reset the flip-flop 170 through the AND gate 160 for the turned-off state of the switching signal $S_W$. The flip-flop 170 is turned on by a pulse signal PLS for generating the switching signal $S_W$. The pulse signal PLS is generated by the pulse generation circuit 250 in response to the signal $V_S$. Comparing the threshold $V_T$ with the current-sense signal $V_{CS}$ by the comparator 151 will induce the resetting of the flip-flop 170 and the turned-off state of the switching signal $S_W$ once the current-sense signal $V_{CS}$ is higher than the threshold $V_T$ also referred to as a current limit threshold. The threshold $V_T$ is applied to limit the maximum switching current $I_P$ of the power converter.

The clamping circuit includes the transistor 120, the addition circuit 125, and a timer circuit 200. The clamping circuit is applied to the voltage feedback loop to clamp the level of the voltage-loop feedback signal $S_V$. The transistor 120 is coupled to the transistor 110 of the level-shift circuit. A signal $V_X$ is coupled to the transistor 120 to determine the maximum level of the voltage-loop feedback signal $S_V$. The signal $V_X$ is determined by a reference signal $V_{R1}$ and a modulation signal $V_M$ via the addition circuit 125 ($V_X=V_{R1}+V_M$). The timer circuit 200 generates the modulation signal $V_M$. The timer circuit 200 is developed by an analog-to-digital circuit (D/A) 220, a counter 215, and a comparator 210. The maximum value generated by the analog-to-digital circuit 220 is set by a reference signal $V_R$, in other words, the maximum level of the modulation signal $V_M$ is set by the reference signal $V_R$. The comparator 210 is coupled to clear (reset) the counter 215. The comparator 210 is utilized to compare the voltage feedback signal $V_{FB}$ with a reference signal $V_{R2}$. The switching signal $S_W$ is coupled to clock the counter 215. Therefore, the signal $V_X$ is equal to the reference signal $V_{R1}$ when the voltage feedback signal $V_{FB}$ is lower than the reference signal $V_{R2}$. Once the voltage feedback signal $V_{FB}$ is higher than the reference signal $V_{R2}$, the counter 215 will start to perform a counting operation according to the switching signal $S_W$ to increase its counted value. Through the analog-to-digital circuit 220, the modulation signal $V_M$ will be gradually increased. The signal $V_X$ is thus increased gradually once the voltage feedback signal $V_{FB}$ is higher than the reference signal $V_{R2}$. The maximum value of the signal $V_X$ will be "$V_{R1}+V_R$" after a delay of the timer circuit 200. The delay time is determined by the frequency of the switching signal $S_W$ and the counter 215.

Figure 3:
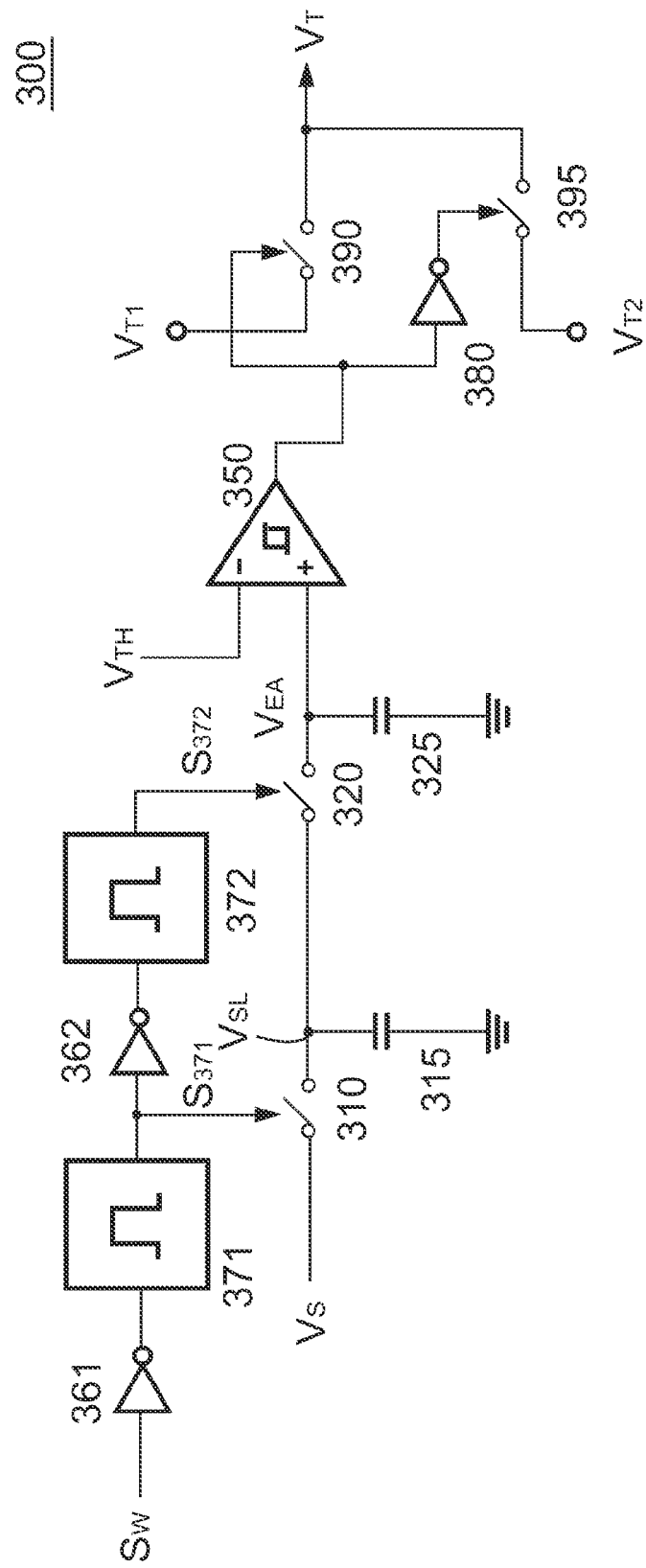
FIG. 3 shows an exemplary embodiment of a voltage detection circuit 300 in the power converter of FIG. 1.

FIG. 3 shows an embodiment of the voltage detection circuit 300. The voltage detection circuit 300 comprises switches 310 and 320, capacitors 315 and 325, a comparator 350, inverters 361 and 362, pulse generators 371 and 372, an inverter 380, and switches 390 and 395. The switch 310 is coupled to receive the signal $V_S$ and store the signal $V_S$ into the capacitor 315 to serve as a signal $V_{SL}$ when the switching signal $S_W$ is turned off. The switch 320 is coupled to switch the signal $V_{SL}$ of the capacitor 315 into the capacitor 325. The switching of the capacitors 315 and 325 develop a low-pass filter for sensing the signal $V_S$. A signal $V_{EA}$ is generated in the capacitor 325 that is correlated to the level of the output voltage $V_O$. The switching signal $S_W$ generates a first sample signal $S_{371}$ through the inverter 361 and the pulse generator 371. The first sample signal $S_{371}$ is applied to control the switch 310. The first sample signal $S_{371}$ generates a second sample signal $S_{372}$ through the inverter 362 and the pulse generator 372. The second sample signal $S_{372}$ is applied to control the switch 320. The signal $V_{EA}$ is coupled to the comparator 350 to compare with a threshold $V_{TH}$ for generating the threshold $V_T$ through the inverter 380 and the switches 390 and 395. The threshold $V_T$ will equal to a threshold $V_{T1}$ when the signal $V_{EA}$ is higher than the threshold $V_{TH}$. The threshold $V_E$ will equal to a threshold $V_{T2}$ once the signal $V_{EA}$ is lower than the threshold $V_{TH}$, in which the threshold $V_{T1}$ is larger than the threshold $V_{T2}$ ($V_{T1}>V_{T2}$). Therefore, the level of the threshold $V_T$ will become lower once the output voltage $V_O$ is lower than a specific value (determined by the threshold $V_{TH}$), which will limit the maximum switching current $I_P$ (determined by the threshold $V_{T2}$) during the output of the power converter is in a short-circuit. According to the above description, the signal $V_S$ is generated though the resistors 31 and 32 and the auxiliary winding of the transformer 10.

Figure 4:
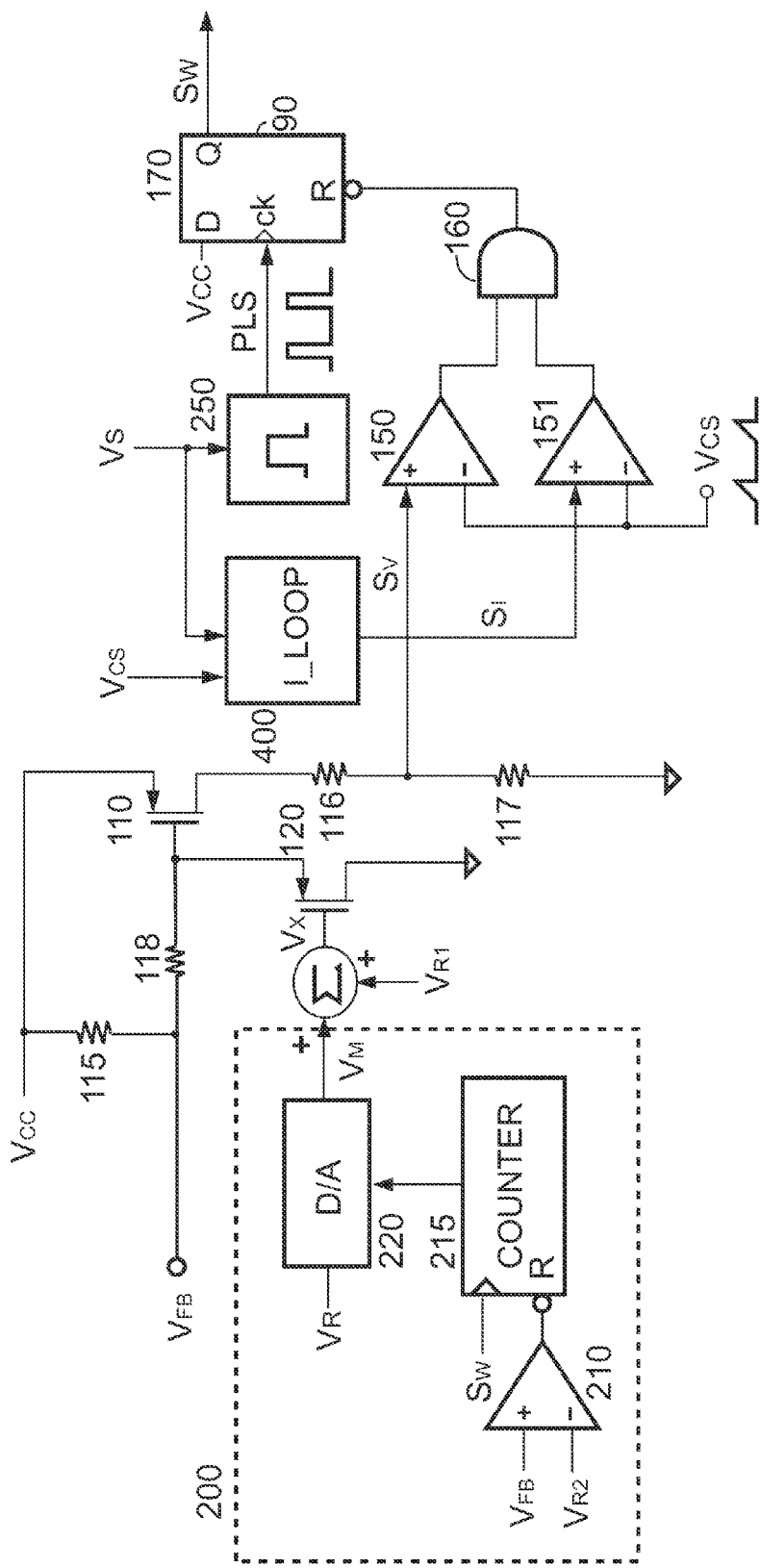
FIG. 4 shows another exemplary embodiment of a controller in the power converter of FIG. 1.

FIG. 4 shows another embodiment of the controller 100. The difference between FIGS. 2 and 4 is that the controller 100 of FIG. 4 comprises a current feedback circuit (I-LOOP) 400 which replaces the voltage detection circuit 300 of FIG. 3. The current feedback circuit 400 is coupled to detect the current-sense signal $V_{CS}$ and the signal $V_S$ for generating a current-loop feedback signal $S_I$. The comparator 151 compares the current-loop feedback signal $S_I$ with the current-sense signal $V_{CS}$ to generate a signal to reset the flip-flop 170 through the AND gate 160 for the turned-off state of the switching signal $S_W$. Refer to the skill of the output current regulation, it had been disclosed in a prior art "Control circuit for controlling output current at the primary side of a power converter", U.S. Pat. No. 6,977,824. The detail of the voltage-loop and the current-loop operation can be found in the prior art of "Close-loop PWM controller for primary-side controlled power converters", U.S. Pat. No. 7,016,204.

Figure 5:
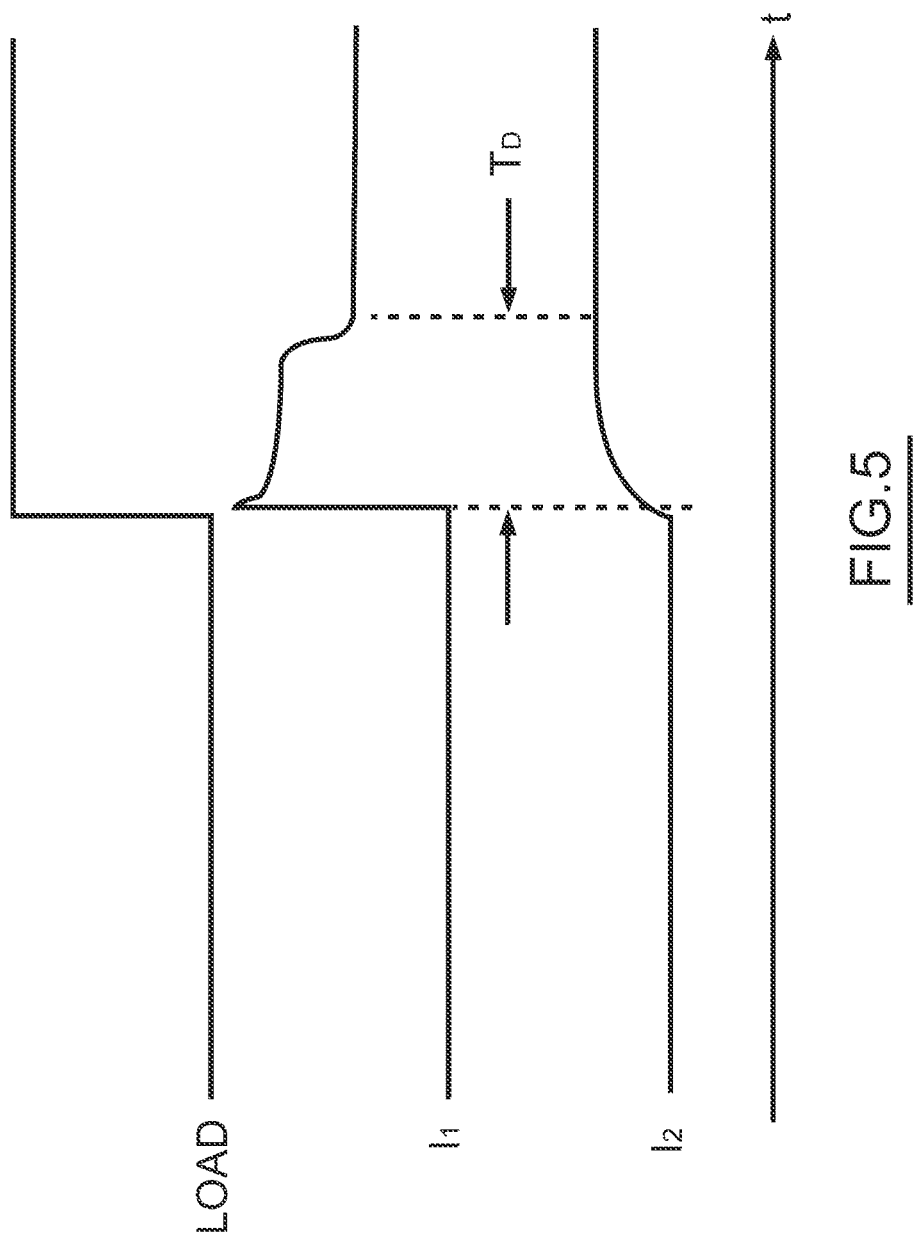
FIG. 5 shows waveforms of an output current that is only controlled by a current feedback circuit and an output current that is controlled by a current feedback circuit 400 and a clamping circuit in the power converter of FIG. 1.

The current feedback circuit 400 may have slow response. In order to achieve the loop stability, the operation bandwidth of the current feedback circuit 400 is set at lower frequency. Thus, its loop response to the load changing is slow. FIG. 5 shows the waveforms of an output current. When the output load (LOAD) of the power converter is changed, the output current $I_1$ includes an overshoot current within a period $T_D$. The period $T_D$ is related to the loop response of the current feedback circuit 400. By adding the clamping circuit, the output current $I_2$ is gradually increased, and no overshoot current is occurred in response to the load change. As the above description, the clamping circuit includes the transistor 120, the addition circuit 125 and the timer circuit 200. The output current $I_O$ (I1 and I2) is related to the switching current $I_P$.

Therefore, the voltage-loop feedback signal $S_V$ is limited under a first level (determined by the signals $V_X$ and $V_{R1}$) for a first load condition. When the load is changed to require a higher output current (a second load condition), the voltage-loop feedback signal $S_V$ can be increased (to a second level) gradually for increasing the switching current $I_P$ and the output current $I_O$. The timer circuit 200 determines the slew rate for the increasing of the switching current $I_P$ and the output current $I_O$. The level of the voltage feedback signal $V_{FB}$ can be used for determining the first load condition and the second load condition according to a embodiment of the present invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller of a power converter comprising:
    a feedback circuit generating a feedback signal in accordance with output of the power converter;
    an output circuit generating a switching signal in accordance with the feedback signal for regulating the output of the power converter; and
    a clamping circuit limiting the feedback signal under a first level for a first load condition and limiting the feedback signal under a second level for a second load condition;
    wherein the clamping circuit includes a timer circuit determining a slew rate of the feedback signal for increasing the feedback signal from the first level to the second level, and the second level is higher than the first level.

2. The controller as claimed in claim 1, wherein the switching signal is coupled to switch a transformer for regulating the output of the power converter.

3. The controller as claimed in claim 1, wherein the first level and the second level of the clamping circuit is determined by a level of a voltage feedback signal.

4. The controller as claimed in claim 1, wherein the timer circuit comprises:
    a counter performing a counting operation according to the switching signal to generate a counted value;
    an analog-to-digital circuit coupled to the counter and generating a modulation signal according to the counted value for limiting the feedback signal; and
    a comparator comparing a voltage feedback signal with a reference signal to clear the counter, wherein the voltage feedback signal is correlated to the output of the power converter.

5. The controller as claimed in claim 1 comprising a current feedback loop or a voltage feedback loop.

6. A controller for limiting a switching current of a power converter, comprising:
    a feedback circuit generating a feedback signal in accordance with output of the power converter;
    an output circuit generating a switching signal in accordance with the feedback signal for regulating the output of the power converter;
    a clamping circuit limiting the feedback signal under a first level for a first load condition and limiting the feedback signal under a second level for a second load condition;
    a current limit threshold coupled to limit the switching current of the power converter;
    wherein the clamping circuit has a timer circuit determining a slew rate of the feedback signal for increasing the feedback signal from the first level to a second level, and the second level is higher than the first level.

7. The controller as claimed in claim 6, wherein the switching signal is coupled to switch a transformer for regulating the output of the power converter.

8. The controller as claimed in claim 6, wherein the current limit threshold is changed in response to change of an input voltage of the power converter.

9. The controller as claimed in claim 8, in which the input voltage is detected through a transformer.

10. The controller as claimed in claim 6, wherein the first level and the second level of the clamping circuit is determined by a level of a voltage feedback signal.

11. The controller as claimed in claim 6, wherein which the timer circuit comprises:
    a counter performing a counting operation according to the switching signal to generate a counted value;
    an analog-to-digital circuit coupled to the counter and generating a modulation signal according to the counted value for limiting the feedback signal; and
    a comparator comparing a voltage feedback signal with a reference signal to clear the counter, wherein the voltage feedback signal is correlated to the output of the power converter.

12. A controller for limiting a switching current of a power converter, comprising:
    a feedback circuit generating a feedback signal in accordance with output of the power converter;
    an output circuit generating a switching signal in accordance with the feedback signal for regulating the output of the power converter;
    a current limit threshold coupled to limit the switching current of the power converter; and
    a clamping circuit limiting the feedback signal under a first level for a first load condition and limiting the feedback signal under a second level for a second load condition;
    wherein the clamping circuit has a timer circuit determining a slew rate of the feedback signal for increasing the feedback signal from the first level to a second level, and the second level is higher than the first level; and
    wherein the switching signal is coupled to switch a transformer for regulating the output of the power converter, and the current limit threshold is changed in response to change of an input voltage of the power converter.

13. The controller as claimed in claim 12, wherein the input voltage is detected through the transformer.

14. The controller as claimed in claim 12, wherein the timer circuit comprising
    a counter performing a counting operation according to the switching signal to generate a counted value;
    an analog-to-digital circuit coupled to the counter and generating a modulation signal according to the counted value for limiting the feedback signal; and
    a comparator comparing a voltage feedback signal with a reference signal to clear the counter, wherein the voltage feedback signal is correlated to the output of the power converter.

* * * * *